(12) United States Patent
Divigalpitiya et al.

(10) Patent No.: US 8,652,375 B2
(45) Date of Patent: Feb. 18, 2014

(54) METHOD AND APPARATUS FOR MAKING SCROLLS FROM EXFOLIATABLE MATERIALS

(71) Applicant: 3M Innovative Properties Company, St. Paul, MN (US)

(72) Inventors: Ranjith Divigalpitiya, London (CA); Tyler J. E. Clark, Appin (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/662,622

(22) Filed: Oct. 29, 2012

(65) Prior Publication Data

US 2013/0136923 A1 May 30, 2013

Related U.S. Application Data

(60) Provisional application No. 61/564,410, filed on Nov. 29, 2011.

(51) Int. Cl.
  *B29C 41/28* (2006.01)
  *B29C 67/02* (2006.01)

(52) U.S. Cl.
  USPC ........... 264/166; 156/246; 156/702; 156/719; 264/105; 264/118; 264/172.19; 264/313; 425/223; 425/440

(58) Field of Classification Search
  USPC .......... 156/246, 701, 702, 719; 264/104, 105; 264/118, 166, 172.19, 175, 304, 313; 425/223, 440
  See application file for complete search history.

(56) References Cited

U.S. PATENT DOCUMENTS

| | | | |
|---|---|---|---|
| 3,369,268 | A | 2/1968 | Burns et al. |
| 4,741,918 | A | 5/1988 | Nagy de Nagybaczon |
| 6,511,701 | B1 | 1/2003 | Divigalpitiya |
| 7,018,496 | B1 | 3/2006 | George |
| 2003/0224168 | A1 | 12/2003 | Mack |
| 2007/0243124 | A1* | 10/2007 | Baughman et al. ......... 423/447.1 |
| 2009/0124705 | A1* | 5/2009 | Meyer et al. .................. 514/769 |
| 2010/0055569 | A1 | 3/2010 | Divigalpitiya |
| 2012/0100203 | A1* | 4/2012 | Fang et al. .................... 424/443 |

FOREIGN PATENT DOCUMENTS

| | | |
|---|---|---|
| EP | 0 955 086 | 11/1999 |
| EP | 1 284 828 | 8/2009 |

OTHER PUBLICATIONS

Kakade, et al., "High-purity synthesis of scrolled mats of multi-walled carbon nanotubes using temperature modulation," Carbon, vol. 46, No. 4, Dec. 25, 2007, pp. 567-576.
Zeng, et al., "Facile Preparation of High-Quality Graphene Scrolls from Graphite Oxide by a Microexplosion Method," Advanced Materials, vol. 23, No. 42, Nov. 9, 2011, pp. 4929-4932.
PCT International Search Report, PCT/US2012/064295.

* cited by examiner

*Primary Examiner* — William Bell
(74) *Attorney, Agent, or Firm* — Steven E. Skolnick; Adrian L. Pishko

(57) ABSTRACT

A method of making scrolls is provided that includes providing a tape having a first side and second side wherein the first side of the tape is has an adhesive disposed thereon and the second side of the tape has a release coating disposed thereon, affixing the adhesive to a solid surface, buff-coating exfoliatable particles on the release side of the tape to form a coating; and peeling the tape from the solid surface at an angle. The coating separates from the release side of the tape and curls inwards to form scrolls. The scrolls can include graphite. Also provided is a continuous method of making scrolls and an apparatus.

16 Claims, 4 Drawing Sheets

METHOD AND APPARATUS FOR MAKING SCROLLS FROM EXFOLIATABLE MATERIALS

FIELD

The present disclosure relates to scrolls from exfoliatable materials and methods of making the same as well as compliant thermally conductive pads made with the same.

BACKGROUND

Graphite is a very important material due to its unusual two dimensional anisotropic properties. It is chemically inert, electrically and thermally conducting. Graphite foil is well known in the art. Typically, graphite foil is made by several steps: graphite particles are first intercalated with acidic materials such as concentrated $HNO_3$ and $H_2SO_4$ acids and the resulting sludge is heated very quickly to a high temperature to expand the particles; the expanded graphite phase, also called "graphite worm" is then rolled to form foil. The resulting foil is large, flexible and chemically resistant; however, the minimum thickness of commercial foil is around 5 mil (75 micrometers). Commercial foils can contain trace amounts of chlorine and sulfur remaining from the process steps which may be undesirable for some applications. During processing emission on toxic products is also an issue with the commercially available graphite foil (example, flexible graphite available as GRAFOIL, Lakewood, Ohio) may be configured to scrolls by rolling and cutting but the purity of available material and the cost are issues.

Methods of coating substrates with dry particles have been disclosed. For example U.S. Pat. No. 4,741,918 (de Nagybaczon et al.) discloses a coating process wherein dry particles are coated on a substrate with a high-energy buffing wheel. Because a buffing wheel is used, this process inherently orients the particles in the direction of travel of the buffing wheel on the substrate. Although a variety of particles are coated using the disclosed method, graphite is not among them.

U.S. Pat. No. 6,511,701 (Divigalpitiya et al.) discloses a method of coating a polymer substrate with a dry composition comprising particles. The particles have a Mohs' hardness between 1 and 2.5 and a largest dimension of less than 100 microns. The particles are buffed on the substrate with an applicator which moves in a manner parallel to the surface of the substrate. The particles can be graphite.

SUMMARY

Use of corrosive chemicals and high temperature is part of the standard process of making graphite foil is described above. It would be desirable, in several respects, to find a process or method of making graphite foil that was simple, high yield, and devoid of the need for harsh chemicals. In the present disclosure a very simple, clean process of making thin binder-free, thin graphite scrolls is provided.

In one aspect, a method of making scrolls is provided that includes a method of making scrolls that includes providing a tape having a first side and a second side wherein the first side of the tape is has an adhesive disposed thereon and the second side of the tape has a release coating disposed thereon; fixing the adhesive to a solid surface; buff-coating exfoliatable particles on the release side of the tape to form a coating; and peeling the tape from the solid surface at an angle, wherein the coating separates from the release side of the tape and curls inwards to form scrolls. The tape can include a mechanical fastener or a pressure-sensitive adhesive as the adhesive on one side. The exfoliatable particles can comprise graphite and the scrolls can be graphite scrolls. The graphite particles can be high purity synthetic high surface area graphite. The tape can be peeled at an angle of from about 0° to about 180° from the solid substrate. The provided graphite scrolls can have a diameter of less than about 3 mm or even less than about 1 mm.

In another aspect, a method of continuously producing scrolls is provided that includes providing a continuous film having a release coating on its inner side, moving the film continuous film around a loop, depositing exfoliatable particles on a portion of the inner side of the continuous film, passing the exfoliatable particles under one or more substantially stationary buffing sanders to form a buff-coated portion of the continuous film, and removing scrolls from the continuous film by passing the buff-coated portion of the continuous film around an idler having a small radius.

In another aspect graphite scrolls are provided having a diameter of less than about 3 mm and a thickness of less than about 1 micrometer.

In yet another aspect, an apparatus for continuously making scrolls is provided that includes a continuous film loop having a release coating on its inner side, a means for depositing exfoliatable particles on the release coating, one or more buffing sanders fitted with pads, a means for driving the continuous film loop; and an inclined pan for catching scrolls released from the release liner. The exfoliatable particles can include graphite.

In another aspect, an apparatus for continuously making scrolls is provided that includes a continuous film loop having a release coating on its inner side, a means for depositing a exfoliatable particles on the release coating, one or more buffing sanders fitted with pads, a means for driving the continuous film loop, and an inclined pan for catching scrolls released from the release liner.

In the present disclosure:

"dry" refers to substantially free of liquid;

"scroll" or "scrolls" refers to a surface that is rolled inward to form a substantially cylindrical shape having a spiral cross-section;

"substantially cylindrical" refers to a tube shape that is close to a hollow cylinder but that that has a spiral cross-section; and "uniform" refers to a substantially consistent thickness of coating over a desired dimension in the plane of a substrate.

The provided method and apparatus for making scrolls from particles of exfoliatable materials avoids the use of corrosive chemicals and high temperatures. The process is simple, high yield, and can be adapted to a continuous roll-to-roll process. In the present disclosure, a very simple, clean process of making thin binder-free, thin scrolls from exfoliatable materials such as, for example, graphite is provided.

The above summary is not intended to describe each disclosed embodiment of every implementation of the present invention. The brief description of the drawings and the detailed description which follows more particularly exemplify illustrative embodiments.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Provided is a method of making scrolls. The scrolls are made by buff-coating exfoliatable particles on the release side of a tape having a first side and a second side. The scrolls are then separated from the release side of the tape. The process is described in more detail here within. The scrolls are thin essentially two-dimensional sheets which have curvature. The scrolls can be curved to form a trough or can form substantially cylindrical spirals. The scrolls can have a curvature that can define a diameter that is less than about 3 mm, less than about 1 mm, less than about 0 1 mm or even smaller. The thickness of the scrolls can be less than about 1.0 micrometer, less than about 0.1 micrometers (100 nanometers), or even less than about 10 nanometers.

Figure 1A:
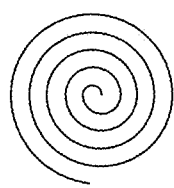
FIGS. 1A-1D are schematic diagrams of top views of different embodiments of scrolls from exfoliatable materials made by the provided methods.
Figure 1B:
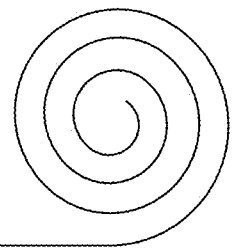
Figure 1C:
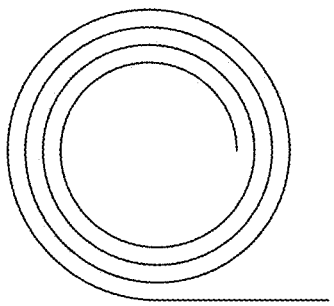
Figure 1D:
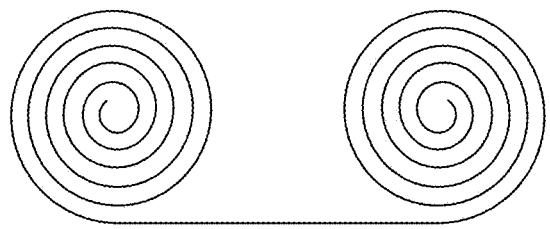
Figure 1E:
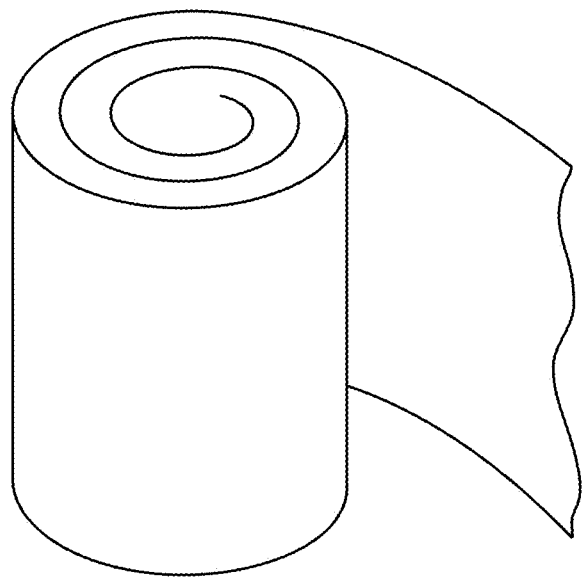
FIG. 1E is a perspective view of the same embodiment shown in FIG. 1A.

FIGS. 1A-1D are schematic diagrams of some embodiments of scrolls. FIGS. 1A-1D show a cross-sectional top down view of different types of scrolls according to the present disclosure. FIG. 1A shows a scroll having a spiral cross-section. FIG. 1B shows a scroll having a planar portion and a spiral cross-section at one end. FIG. 1C shows a scroll that has a spiral cross-section that surrounds a large void in along the center axis. FIG. 1D is a cross-sectional top down view of an embodiment of a provided scroll that includes two spiral sections connected by a non-spiral section. FIG. 1E is a perspective view of the scroll of FIG. 1A. In some embodiments, the scrolls may have planar spiral cross-sections but may telescope so as to force the spiral cross-section to be nonplanar.

The provided method includes providing a tape having a first side and a second side. The first side of the tape can have an adhesive disposed thereon. The purpose of the adhesive is to provide a means for anchoring the tape to a solid surface. The second side of the tape has a release coating disposed thereon. The release coating prevents the tape from sticking to itself and also provides a surface for application and processing of exfoliatable particles into a coating, and a surface from which the coating can be separated to form scrolls.

The provided scrolls can be made by buff-coating exfoliatable particles on the release side of the tape. For purposes of the present disclosure, the term "exfoliatable particle" means a particle that breaks up into flakes, scales, sheets or layers upon application of shear force. Typical exfoliatable materials include graphite, $MoS_2$ (molybdenum disulfide), $WS_2$ (tungsten disulfide), clays (kaolin), and h-BN (hexagonal boron nitride). In some embodiments, the exfoliatable particles can also include some non-exfoliatable particles which can act as buffing aids.

Graphite is an exfoliatable material that is one of the allotropic forms of carbon. It consists of layered, flat plates of a hexagonal lattice of carbon stacked one on top of the other. Graphite is electrically conducting and is considered a semimetal. Because of its structure it has unusual electrical, thermal, and acoustical properties and has found a large number of applications. Recently, one-layer flat plates of carbon having a regular hexagonal lattice and referred to as "graphene" have been shown to have exceptional electrical properties.

The provided method of making graphite scrolls includes providing a tape having a first side and a second side. The tape can have a release coating on one side and an adhesive on the other side. In some embodiments, the adhesive can include a mechanical fastener. In other embodiments, the adhesive can include a pressure-sensitive adhesive. The tape can be made of any material that can support and adhere to a release coating on one side an adhesive on the other side. Typically, the tape can be a metal foil, a polymer, a porous or microporous membrane, a woven or non-woven webs, a fabric, a paper, an elastomeric material, or a foam.

Typically the tape can include non-porous polymeric substrates, such as, for example, polyester, polypropylene, polyethylene, polystyrene, polycarbonate, polyvinylchloride, polyimide, polymethyl methacrylate, cellulose, and polyvinyl chloride. In some embodiments, the substrate can be paper, a woven or non-woven fabric, or a foam such as a polyurethane or polystyrene foam. The substrate may be relatively smooth in nature, or alternatively may be provided with macro or micro geometry. The tapes can have a release coating on the first side of the tape. Typical release coatings include polyurethanes, polysiloxanes, and fluoropolymers. They can be coated on the tape and adhered to the type by means known to those having ordinary skill in the art of adhesive tapes. The tape can also include an adhesive on the second side. In some embodiments, the adhesive can be a mechanical fastener. Mechanical fasteners include reclosable mechanical fasteners which releasably close, so as to allow later reopening. Known reclosable mechanical fasteners typically have fastenable surfaces fabricated from metal or thermoplastic resins. Examples of such thermoplastic resins include polyesters (e.g., poly(ethylene terephthalate)), polyamides, poly(styrene-acrylonitrile), poly(acrylonitrile-butadiene-styrene), polyolefins (e.g., polypropylene and polypropylene/polyethylene copolymers), and plasticized polyvinyl chloride. Examples of reclosable mechanical fasteners include those sold under the VELCRO trade designation and which are available from Velcro USA, Inc. of Manchester, N.H. Other reclosable mechanical fasteners are sold under the SCOTCHMATE and DUAL LOCK trade designations and are available from Minnesota Mining & Manufacturing Co. of St. Paul, Minn. Such fasteners have found widespread use for fastening a variety of materials, such as clothing and diapers. Other uses for such fasteners include attaching interior panels in airplanes and automotive dashboards. Reclosable mechanical fasteners are also widely used for sealing food products, such as in plastic bags sold by S.C. Johnson Wax of Racine, Wis., under the trade designation ZIPLOC. It is also contemplated that the first side of the tape can have other materials designed to temporarily hold the tape down to a solid surface. For example, materials, such as magnetically- or electrically-attracting materials, can be used for this purpose.

In some embodiments, the adhesive on the first side of the tape can be a pressure-sensitive adhesive. The pressure-sensitive adhesive can be made of any polymer as long as it is tacky when applied. Exemplary pressure-sensitive adhesives include acrylic pressure-sensitive adhesive, silicone pressure-sensitive adhesives, tackified rubber pressure-sensitive adhesives, to name a few. The adhesive on the first side of the tape can be fixed to a solid surface during application of the exfoliatable particles to provide a solid support for the application of these particles. By "fixing" it is meant that the adhesive is made to adhere to the solid surface by pressure, heat, or a combination thereof.

The exfoliatable particles can be buff-coated onto the release side of the tape to form a coating. The coating can be a substantially uniform coating that has a maximum average thickness of less than about 100 millimeters, less than about 50 millimeters, less than about 10 millimeters, or even less than about 1 millimeter. In some embodiments, when graphite is used as the exfoliatable particles, a substantially uniform coating can be produced that is less than 1 micrometer in thickness.

The coating can be produced from a dry composition (with substantially no solvent present). An exemplary process for applying the carbon coating as a dry composition can be found, for example, in U.S. Pat. No. 6,511,701 and U.S. Pat. Appl. Publ. No. 2010/0055569 (both Divigalpitiya et al.). This process, which is described later in more detail, can provide very thin, coatings on a substrate.

The dry composition can include the exfoliatable particles and additional components. When the exfoliatable particles are carbon, they can include any form or type of carbon. Exemplary carbon useful in the provided electrodes include conductive carbons such as graphite, carbon black, lamp black, or other conductive carbon materials known to those of skill in the art. Typically, exfoliatable carbon particles (i.e., those that break up into flakes, scales, sheets, or layers upon application of shear force) are used. An example of useful exfoliatable carbon particles is HSAG300, available from Timcal Graphite and Carbon, Bodio, Switzerland. Other useful materials include, but are not limited to SUPER P and ENSACO (Timcal). In some embodiments the exfoliatable particles can include high purity synthetic high surface area graphite.

The dry composition can also include a binder. The binder can function to improve adhesion to the composition to the substrate. Typical binders that can be useful in the provided electrodes include polyvinylidene fluoride, polyimide, poly (acrylic acids), poly(styrenesulfonates), polycarboxylic acids and their lithium salts. An exemplary binder that can be useful is KYNAR 741 (polyvinylidene fluoride), available from Arkema, Oakville, Canada.

Mixtures of the above materials can also be buffed to form coatings of desired characteristics. By varying the proportion of the constituents in the mixture very dramatic changes in the surface properties can be obtained. For example, with a mixture of graphite and polyvinylidene difluoride, surface resistance can be varied from $10^3$ ohms/square to $10^{11}$ ohms/square by varying the ratio of the materials. As the above example shows, one can prepare electrically insulating, electrostatic dissipating or electrically conducting coating with the mixture just by varying the composition easily.

The provided method also includes coating the substrate with a dry composition including particles, wherein coating the substrate comprises buffing an effective amount of said particles on said substrate at a pressure normal to the surface of greater than 0 and less than about 30 $g/cm^2$ using an applicator pad, said applicator pad moving in a plane parallel to said surface in a plurality of directions relative to a point on the surface such that a substantially uniform coating of said particles is provided, and wherein said particles have a Mohs' hardness between 0.4 and 3.0 and a largest dimension of less than about 100 microns. Thus, in the provided process the composition is provided in a solid form, rather than in a liquid or paste form. Surprisingly it has been found that the use of dry particles that are not provided in a liquid or paste format is essential to obtaining this uniformity, because non-uniformity is introduced by evaporation of the liquid carrier of liquid or paste compositions.

Mohs' hardness is a scale indicating the hardness of a material. The hardness of the particles of the present invention is established as the Mohs' scale hardness of the material in bulk. Mohs' hardness values are widely reported in the literature, including the CRC *Handbook of Chemistry and Physics*, and the Kirk-Othmer *Encyclopedia of Chemical Technology*. Particles of a material having a Mohs' hardness between 0.4 and 3.0 are considered to be "buffable" for purposes of the present invention.

In the provided buff-coating method, the buffing pad can be moved in the plane of the substrate parallel to the substrate surface. The orbital motion of the pad in the present invention can be carried out with its rotational axis perpendicular to the substrate or web. Thus, the pad can move in a plurality of directions during the buffing application, including directions transverse to the direction of the web in the case where the web is moving past the applicator (buffing) pad.

Applicator pads for use in the present invention may be any appropriate material for applying particles to a surface. For example, applicator pads may be woven or non-woven fabric or cellulosic material. Alternatively, the pads may be a closed cell or open cell foam material. In yet another alternative, the pads may be brushes or an array of bristles. Typically, the bristles of such brushes have lengths of about 0.2-1.0 cm, and diameters of about 30-100 microns. Bristles are preferably made from nylon or polyurethane. Preferred buffing applicators include foam pads, EZ PAINTR pads (described in U.S. Pat. No. 3,369,268), lamb's wool pads, 3M PERFECT IT pads, and the like. The buffing applicator moves in an orbital pattern parallel to the surface of the substrate with its rotational axis perpendicular to the plane of the substrate. The buffing motion can be a simple orbital motion or a random orbital motion. The typical orbital motion used is in the range of 50-10,000 orbits per minute. Coating parameters can be varied to find an optimum setting to produce coatings of desired thicknesses. For example, the thickness of the buffed coating can be controlled by varying the time of buffing. Generally, the thickness of the coating increases linearly with time after a certain rapid initial increase. The longer the buffing operation, the thicker the coating. Also, the thickness of the coating can be controlled by controlling the amount of powder on the pads used for buffing. The present continuous web process can be capable of producing coatings with unique characteristics that offer substantial utility to many markets. The process involves application of powder materials to a web base substrate with a lateral "buffing" action. Coatings thus produced may have various electrical, optical and decorative features. Surprisingly, high quality thin coatings can be consistently prepared by this simple, dry, solventless process.

After the coating is formed on the release side of the tape from buff-coating the exfoliatable particles, the tape is peeled from the solid surface at an angle of from nearly zero degrees to about 180 degrees from the plane of the solid substrate. The angle is measured from the flat tape on the substrate (0° angle) to 180° wherein the tape is completely pulled back on itself. Typically, when the tape is peeled from the solid surface the coating can separate from the release side of the tape and curl inwards to form scrolls. The angle of the peel can be increased until the coating separates from the release side of the tape. Typically, the angle is greater than 90° and even greater than 120°. In some embodiments, the angle is between 90° and 120° from the substrate.

Figure 2A:
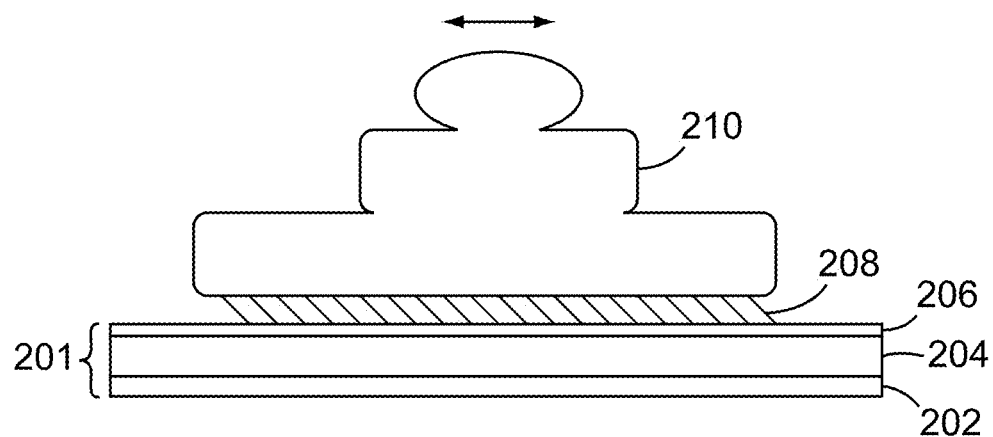
FIGS. 2A and 2B are schematic diagrams showing an embodiment of the provided two-step process of making graphite scrolls.
Figure 2B:
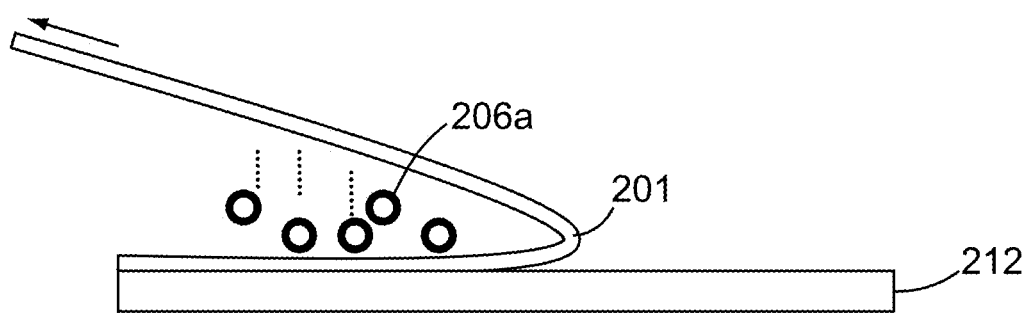

The method is illustrated in FIGS. 2A and 2B. In FIG. 2A, tape 201, having a first side and a second side comprises substrate 204 which has adhesive 202 disposed upon its first side and release layer 206 disposed upon its second side. Tape 201 is affixed to a substrate (not shown in FIG. 2A). Exfoliatable particles (not shown) are applied to release layer 206 and then buff-coated using applicator pad 208 which is attached to applicator handle 210. Buff-coating is performed by moving applicator handle 210 back and forth to form a thin layer or coating from the exfoliatable particles. After buff-coating the exfoliatable particles on release side 206 of tape 201 to form a thin coating, tape 201 is peeled from substrate 212 at an angle (shown to be about 150o from the substrate in FIG. 2B). The peeling causes the coating to separate from the release side of tape 201 and to curl inwards to from scrolls 206a which can be collected.

Figure 3A:
FIGS. 3A and 3B are photographs of provided graphite scrolls made by the provided method.
Figure 3B:
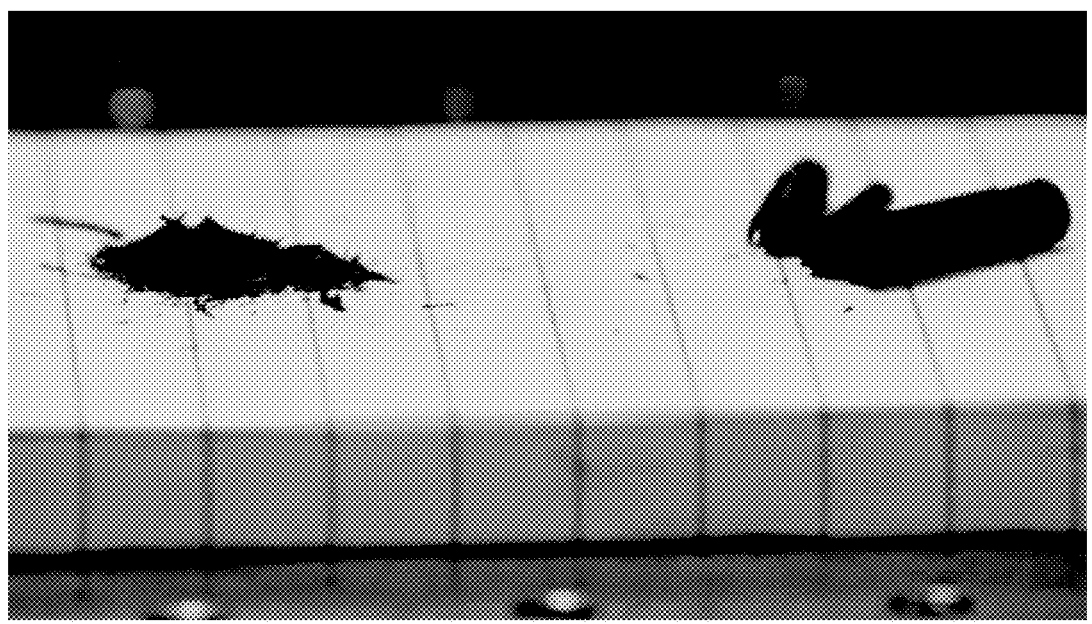

FIG. 3A and 3B show are photographs of provided graphite scrolls made by the provided method. In FIGS. 3A and 3B the scrolls are shown at different magnifications on a POST-IT pad which has 9 mm lines. The scrolls in the photographs were released from the backside of 810 MAGIC tape (available from 3M Company, St. Paul, Minn.). In FIG. 2A the diameter of the scrolls is about 2-3 mm. FIG. 3A shows the same scrolls on the right hand side of the photograph. FIG. 2A shows scroll with a smaller diameter of less than 1 mm which were produced by peeling the tape at a larger angle.

Figure 4:
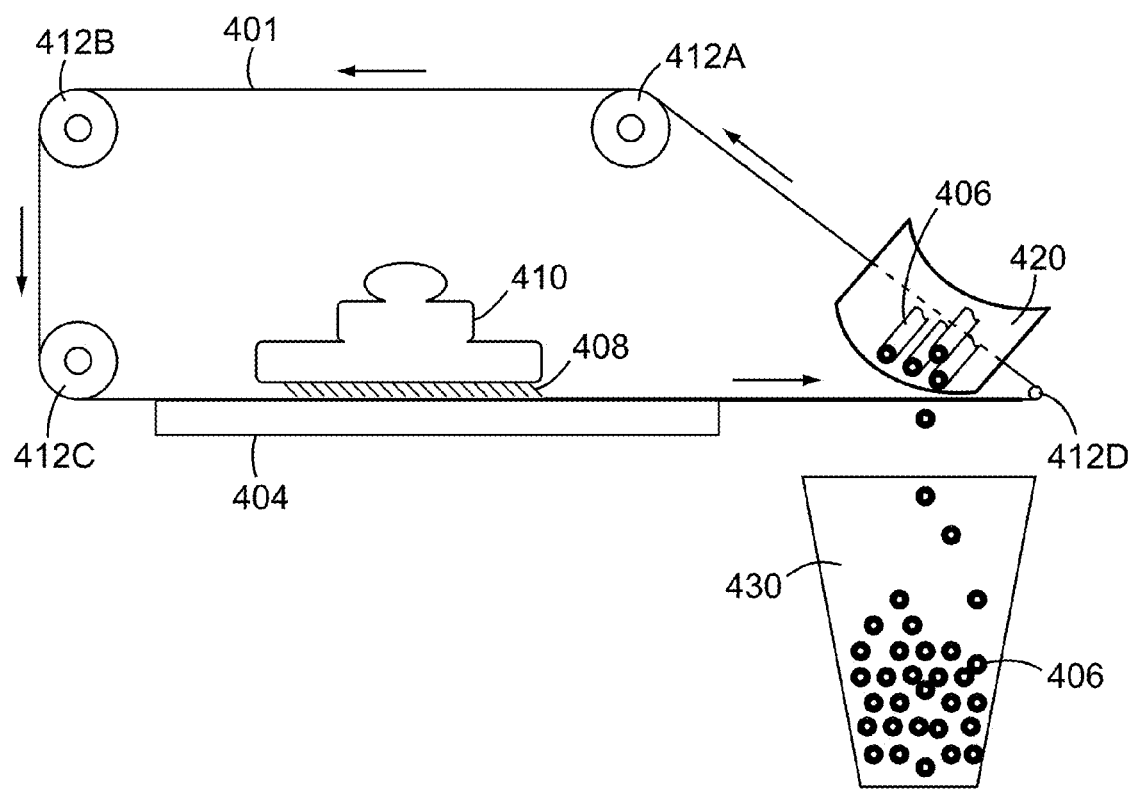
FIG. 4 is a schematic of an embodiment of an embodiment of an apparatus and a continuous process for making graphite scrolls.

FIG. 4 is a schematic of an embodiment of a continuous process for making graphite scrolls. In this embodiment, a continuous web or tape 401 having a release coating on its inner side is moved in a continuous loop (film) around idlers 412A-D in the direction indicated by the arrows. During its journey from idler 412C to 412D, tape 401 passes over solid substrate 404 at which location exfoliatable particles (not shown in drawing) are deposited on a portion of the inner side of the continuous loop. The exfoliatable particles are then passed under one or more substantially stationary buffing sanders (one is shown in FIG. 4 and comprises handle or housing 410 attached to applicator pad 408. then buffed with applicator pad 408 which is attached to handle 410. A buff-coated portion of continuous film 401 is formed. When tape 401 that now includes a coating of exfoliatable particles passes around idler 412D at an angle, scrolls 406 are removed or separate from the continuous film. They fall from continuous film 401 and are deflected by inclined pan 420 into container 430 which then is the final collection point for the scrolls.

The provided method for making scrolls can produce scrolls that are substantially cylindrical and have a diameter of less than about 3 mm or even less than about 1 mm. The provided scrolls can have a thickness of less than about 1 micrometer. The length of the scrolls can be predetermined by marking or indenting the coating before it is separated from the tape. The marking or indenting can be accomplished, for example, by scoring the coating with a tool or a blade. In some embodiments, the length of the scrolls can be from about a few millimeters to several centimeters in length.

In another aspect, an apparatus for continuously making scrolls is provided that includes a continuous film loop having a release coating on its inner side. The film loop (or tape) is described above. A means for depositing exfoliatable particles on the release coating is provided. The means can include any method of depositing particles on a web such as powder coating, electrostatic coating, sprinkling with an automated conveyer, or other depositing means well known to those of ordinary skill in the art. One or more buffing sanders fitted with pads can be placed in contact with at least a portion of the deposited exfoliatable particles. The loop can be continuously driven by a means for driving the loop. The means can include a drive roller, a nip, air conveyance, or any means of driving a web known to those of ordinary skill in the art. The provided apparatus also includes an inclined pan for catching scrolls released from the liner.

In some embodiments, graphite scrolls are useful due to their high thermal conductivity. They can be used in applications that take advantage of such properties.

Objects and advantages of this invention are further illustrated by the following examples, but the particular materials and amounts thereof recited in these examples, as well as other conditions and details, should not be construed to unduly limit this invention.

EXAMPLES

Example 1

Strips of 3M 810 MAGIC Tape were fixed on to a glass plate and TIMCAL HSAG300 graphite exfoliatable particles was buff coated on them on the release side of the tape. Buffing was done for about two minutes and the tape was released from the glass at an acute angle as shown in FIG. 4. During peeling, pieces of thick graphite coating were separating from the release surface and were curling inwards to form scrolls as in FIG. 2B. The scrolls were of uniform length determined by the width of the 810 tape (¾" or 19 mm)

Example 2

In the above Example 1, the angle of peeling was varied from about 90° to about 30° and the diameter of the resulting scrolls were varied from a few millimeters to sub-millimeter.

Example 3

Example 1 was repeated with M850 graphite and was found to yield scrolls.

Example 4

Example 1 was repeated with $MoS_2$ as the buffing material and again we found that scrolls of $MoS_2$ can be prepared with this method.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A method of making scrolls comprising:
   providing a tape having a first side and a second side wherein the first side of the tape has an adhesive disposed thereon and the second side of the tape has a release coating disposed thereon;
   fixing the adhesive to a solid surface;
   buff-coating exfoliatable particles on the release side of the tape to form a coating; and
   peeling the tape from the solid surface at an angle,
   wherein the coating separates from the release side of the tape and curls inwards to form scrolls.

2. A method of making scrolls according to claim 1, wherein the scrolls comprise graphite.

3. A method of making scrolls according to claim 2, wherein the tape comprises a substrate selected from polyester, cellulose, polyester, polypropylene, polyethylene, polystryrene, polycarbonate, polyvinylchloride, polyimide, polymethyl methacrylate, cellulose, and polyvinyl chloride.

4. A method of making scrolls according to claim 2, wherein the scrolls are substantially cylindrical and have a diameter of less than about 3 mm.

5. A method of making scrolls according to claim 4, wherein the scrolls have a diameter of less than about 1 mm.

6. A method of making scrolls according to claim 4, wherein the scrolls have a thickness of less than about 1 micrometer.

7. A method of making scrolls according to claim 1, wherein the adhesive comprises a mechanical fastener.

8. A method of making scrolls according to claim 7, wherein the solid surface comprises glass, metal, polymer, ceramic, or a combination thereof.

9. A method of making scrolls according to claim 1, wherein the exfoliatable particles comprise high purity synthetic high surface area graphite.

10. A method of making scrolls according to claim 1, wherein the buff-coating is performed for at least 2 minutes.

11. A method of making scrolls according to claim 1, wherein the tape is peeled at an angle of from about 0° to about 180° from the solid surface.

12. A method of making scrolls according to claim 11, wherein the tape is peeled at an angle of from about 90° to about 150° from the solid surface.

13. A method of continuously producing scrolls comprising:
    providing a continuous film having a release coating on its inner side;
    moving the continuous film around a loop;
    depositing exfoliatable particles on a portion of the inner side of the continuous film;
    passing the exfoliatable particles under one or more substantially stationary buffing sanders to form a buff-coated portion of the continuous film; and
    removing scrolls from the continuous film by passing the buff-coated portion of the continuous film around an idler having a small radius.

14. A method of continuously producing scrolls according to claim 13, wherein the exfoliatable particles comprise graphite.

15. An apparatus for continuously making scrolls comprising:
    a continuous film loop having a release coating on its inner side;
    a means for depositing a exfoliatable particles on the release coating;
    one or more buffing sanders fitted with pads;
    a means for driving the continuous film loop;
    an idler having a small radius; and
    an inclined pan for catching scrolls release from the release coating.

16. An apparatus for continuously making scrolls according to claim 15, wherein the exfoliatable particles comprise graphite.

* * * * *